(12) United States Patent
Park et al.

(10) Patent No.: US 10,129,911 B2
(45) Date of Patent: Nov. 13, 2018

(54) METHOD AND APPARATUS FOR PROCESSING AN UPLINK UNIT IN A WIRELESS LAN SYSTEM

(71) Applicant: LG ELECTRONICS INC., Seoul (KR)

(72) Inventors: Eunsung Park, Seoul (KR); Jinsoo Choi, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 15/214,388

(22) Filed: Jul. 19, 2016

(65) Prior Publication Data

US 2017/0026952 A1 Jan. 26, 2017

Related U.S. Application Data

(60) Provisional application No. 62/195,297, filed on Jul. 22, 2015, provisional application No. 62/194,302, filed on Jul. 20, 2015.

(51) Int. Cl.
*H04L 12/28* (2006.01)
*H04W 76/00* (2018.01)
*H04W 84/12* (2009.01)

(52) U.S. Cl.
CPC ............ *H04W 76/00* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,571,010 | B1* | 10/2013 | Zhang | H04L 29/10 370/230 |
| 2010/0046358 | A1* | 2/2010 | van Nee | H04J 13/00 370/210 |
| 2016/0099764 | A1* | 4/2016 | Yang | H04B 7/0697 370/329 |

OTHER PUBLICATIONS

Provisional U.S. Appl. No. 62/059,808, filed Oct. 3, 2014.*

* cited by examiner

*Primary Examiner* — Edan Orgad
*Assistant Examiner* — Sithu Ko
(74) *Attorney, Agent, or Firm* — Lee, Hong, Degerman, Kang & Walmey

(57) ABSTRACT

A method for processing an uplink PPDU in a wireless LAN system is proposed herein. The uplink PPDU may correspond to a PPDU that is received from multiple users. In the receiving device, a first uplink MU PPDU may be received from a first user, and a second uplink MU PPDU may be received from a second user. In this case, CSD of an enhanced method may be applied to LTF signals respective to each of the first uplink MU PPDU and the second uplink MU PPDU. Additionally, an orthogonal mapping matrix may be applied to the LTF signals respective to each of the MU PPDUs as a method ensuring orthogonality between the streams.

8 Claims, 24 Drawing Sheets

FIG. 1
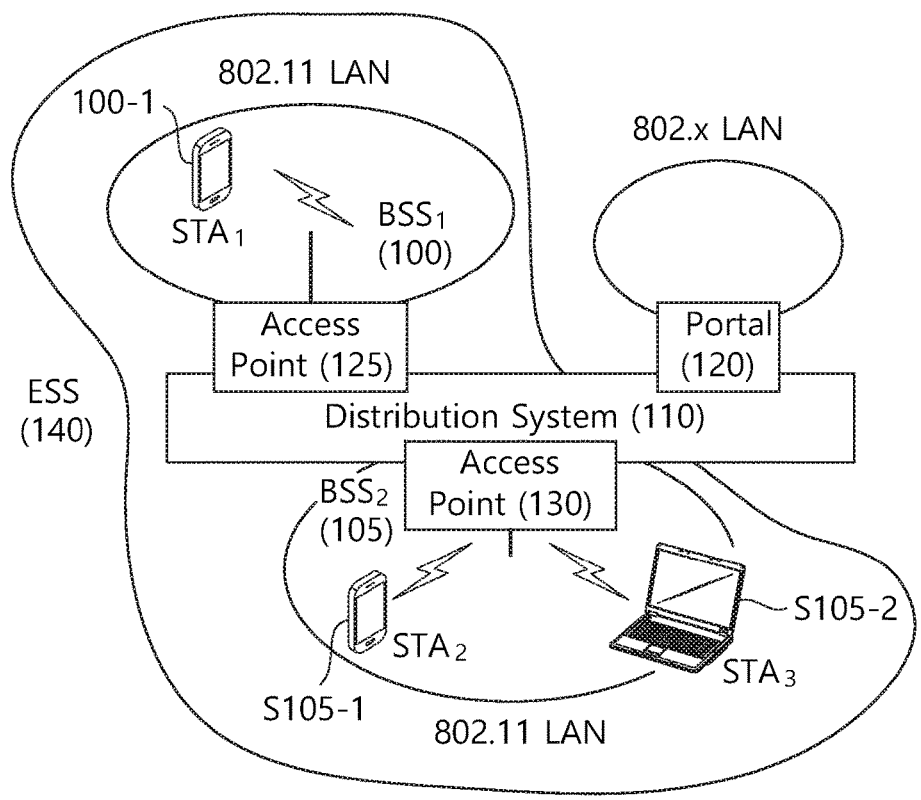
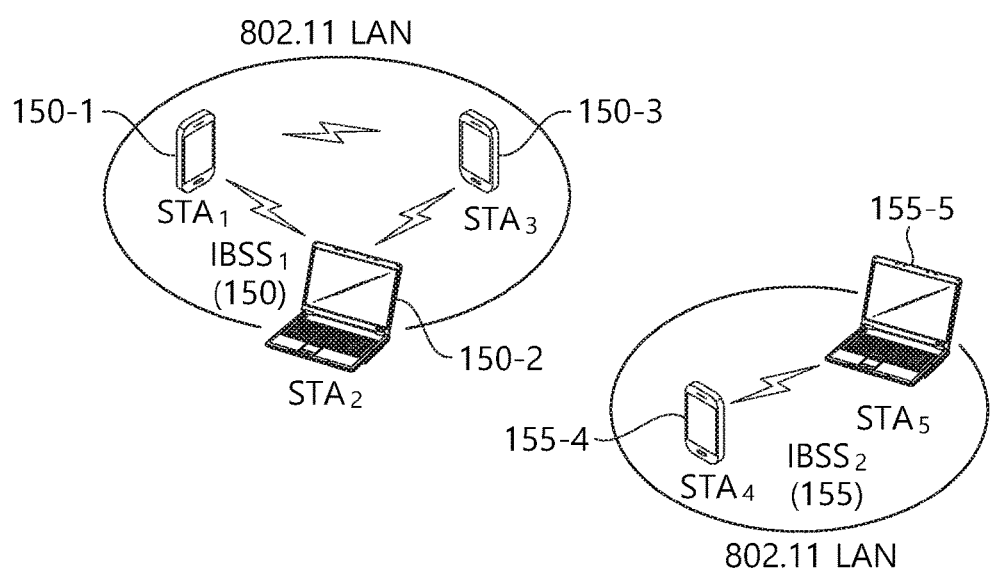

METHOD AND APPARATUS FOR PROCESSING AN UPLINK UNIT IN A WIRELESS LAN SYSTEM

CROSS-REFERENCE TO RELATED APPLICATIONS

Pursuant to 35 U.S.C. § 119 (e), this application claims the benefit of U.S. Provisional Application No. 62/194,302, filed on Jul. 20, 2015, and 62/195,297, filed on Jul. 22, 2015, the contents of which are all hereby incorporated by reference herein in their entirety.

BACKGROUND OF THE INVENTION

Technical Field

This specification relates to an uplink transmission in a wireless LAN system, and more particularly, to a method for processing an uplink unit for multiple users in a wireless LAN system.

Description of the Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

This specification proposes enhanced method related to uplink transmission in a wireless LAN system.

An example of this specification proposes an enhanced CSD application method for efficiently processing a specific training signal of a multi-user PPDU.

An example of this specification proposes an enhanced method, wherein an orthogonal mapping matrix is applied to a training signal in order to efficiently process a specific training signal of a multi-user PPDU.

An example of this specification proposes a method for processing an uplink PPDU in a wireless LAN system.

An example of this specification is applicable to an AP, which performs communication with multiple users.

A method according to an example of this specification may include the steps of receiving a first Multi-user Physical layer Protocol Data Unit (MU PPDU) from a first user and receiving a second MU PPDU from a second user, and processing the first and second uplink MU PPDUs.

In this case, each of the first and second uplink MU PPDUs may correspond to at least one stream.

Each of the first and second uplink MU PPDUs may respectively include first and second long training field (LTF) signals.

Each of the first and second LTF signals may be generated by using a method having an orthogonal mapping matrix and cyclic shift delay (CSD) applied therein.

And, a first CSD value allocated to the first LTF signal may be different from a second CSD value allocated to the second LTF signal.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
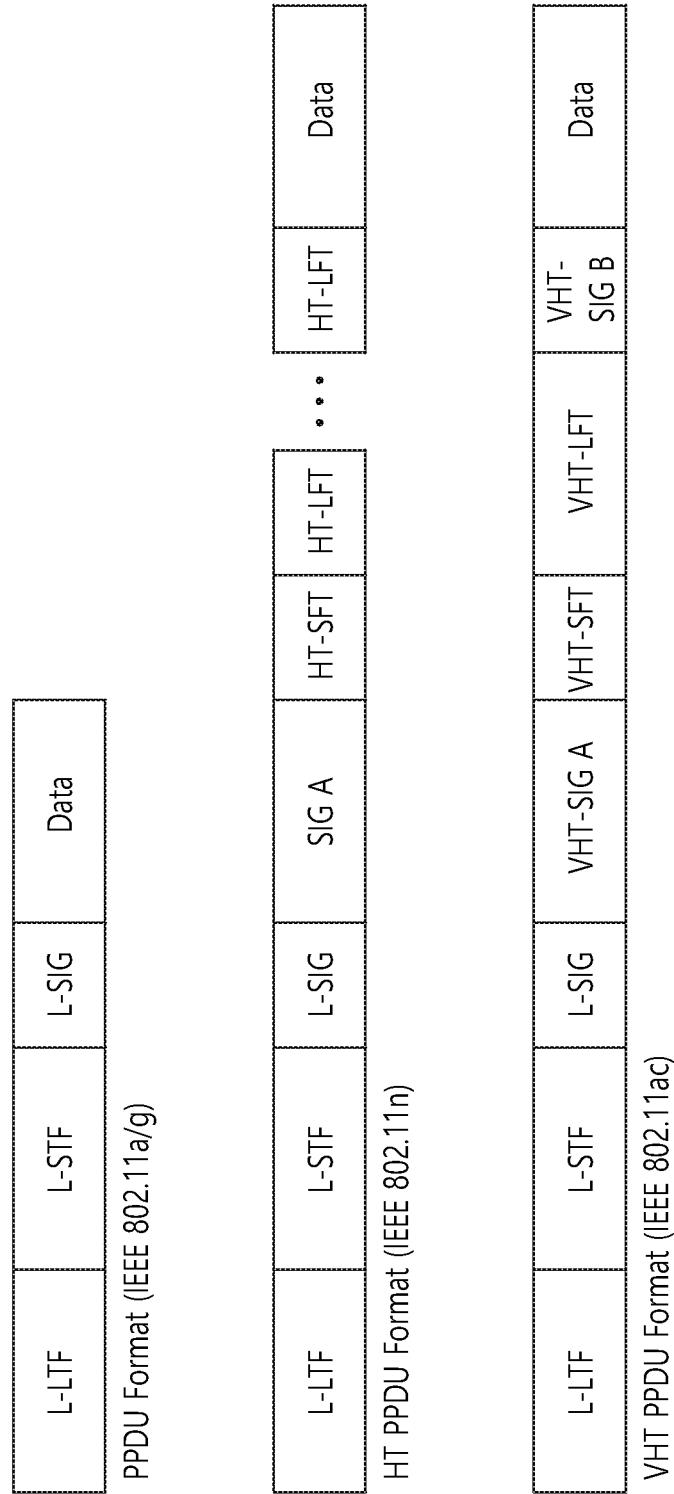
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
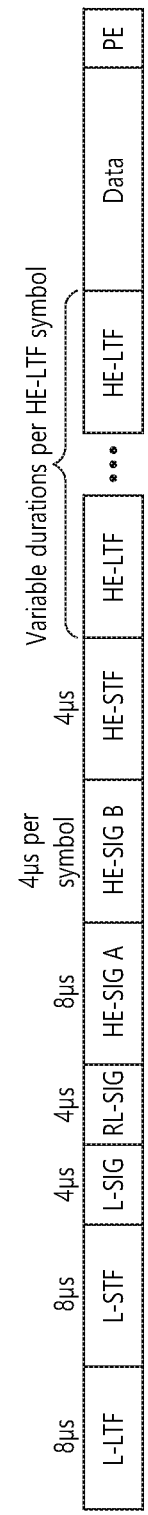
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 µs).

More detailed description of the respective fields of FIG. 3 will be made below.

Figure 4:
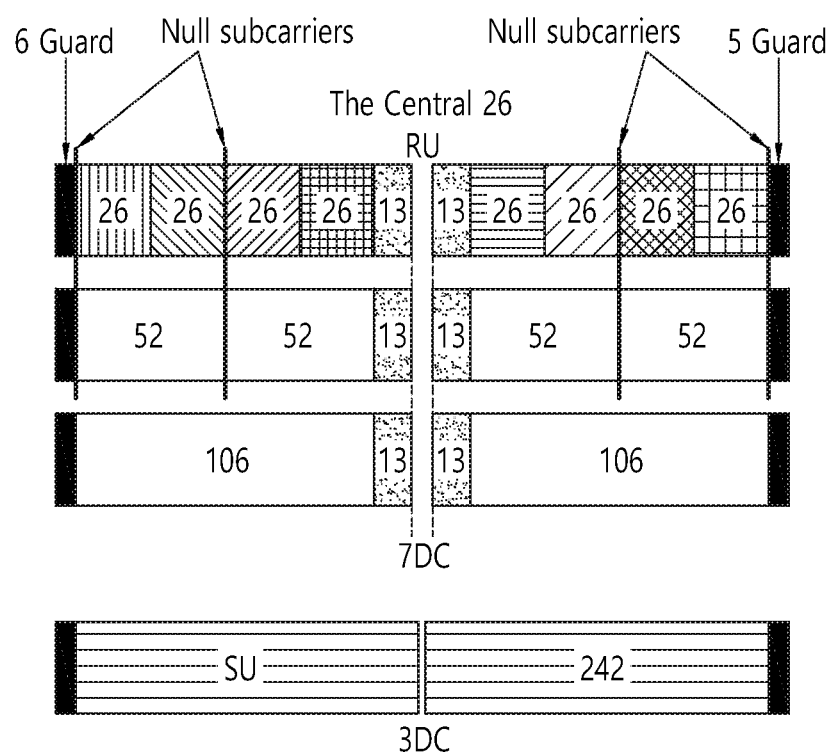
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the H3-STF, the HE-LTF, and the data field.

As illustrated in an uppermost part of FIG. 4, 26 units (that is, units corresponding to 26 tones). 6 tones may be used as a guard band in a leftmost band of the 200 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
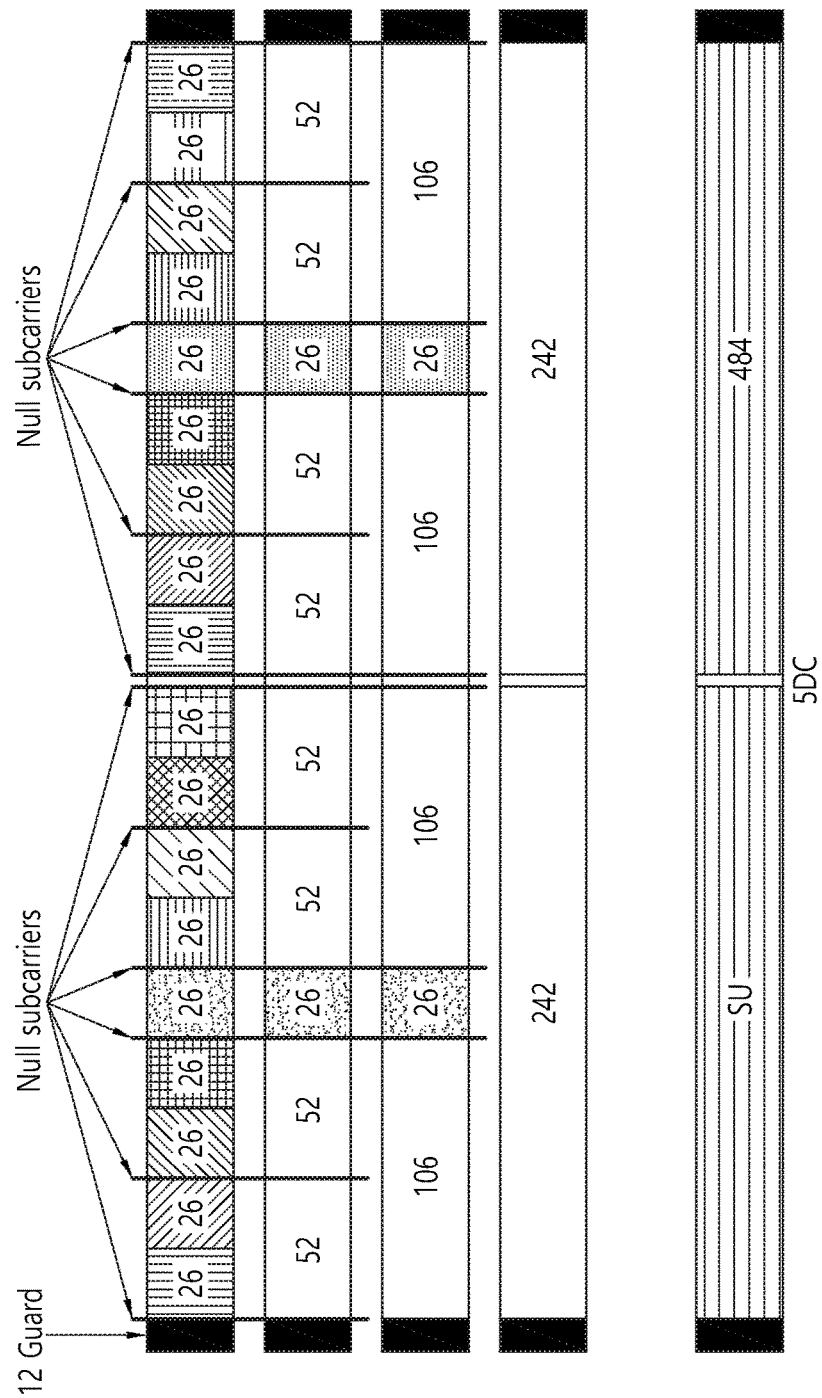
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
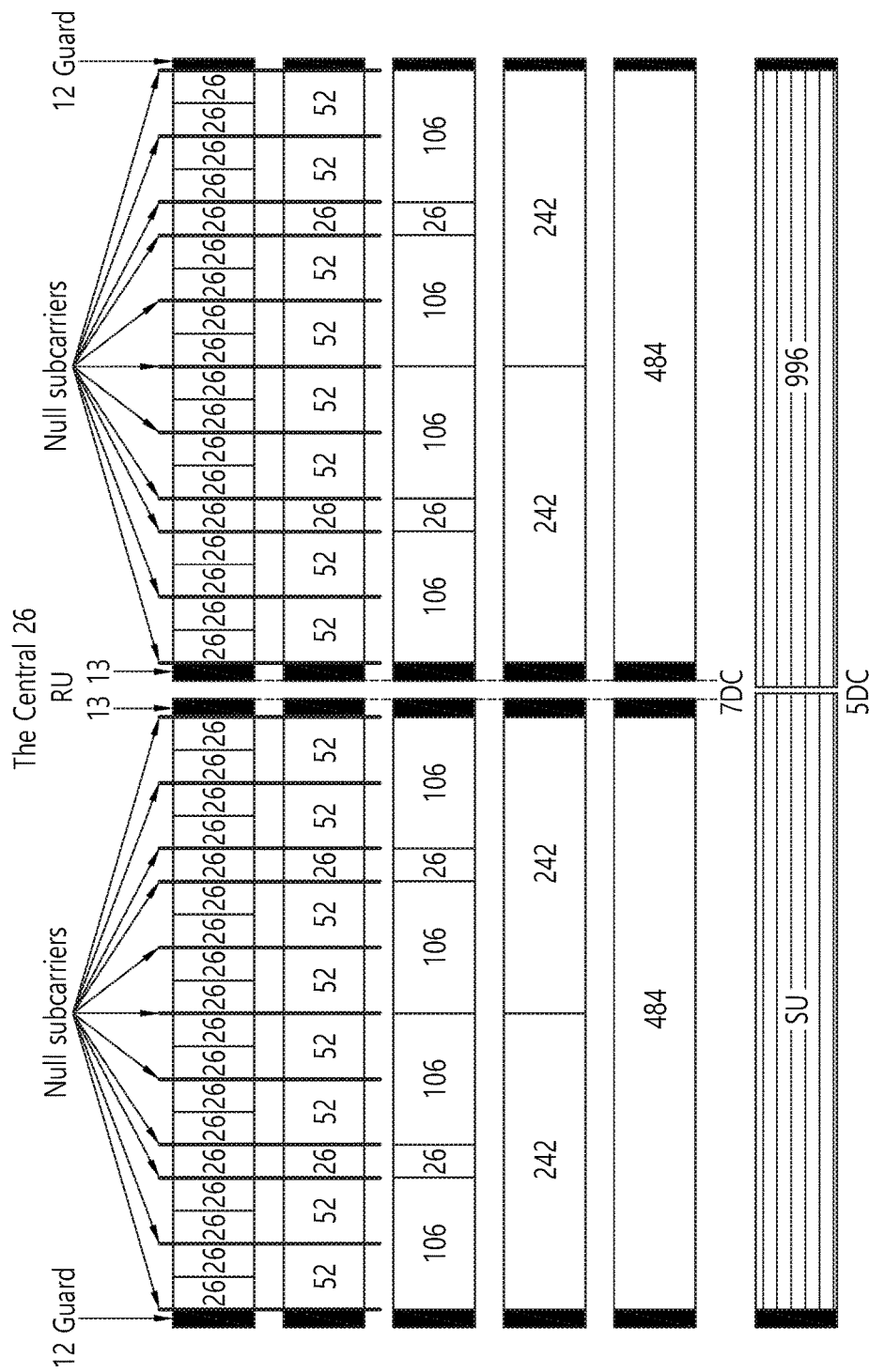
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Additionally, as shown in the drawing, in case of being used for a single user, 996-PU may be used. Meanwhile, the feature that the detailed number of RUs can be changed is the same as the example shown in FIG. 4 and FIG. 5.

Figure 7:
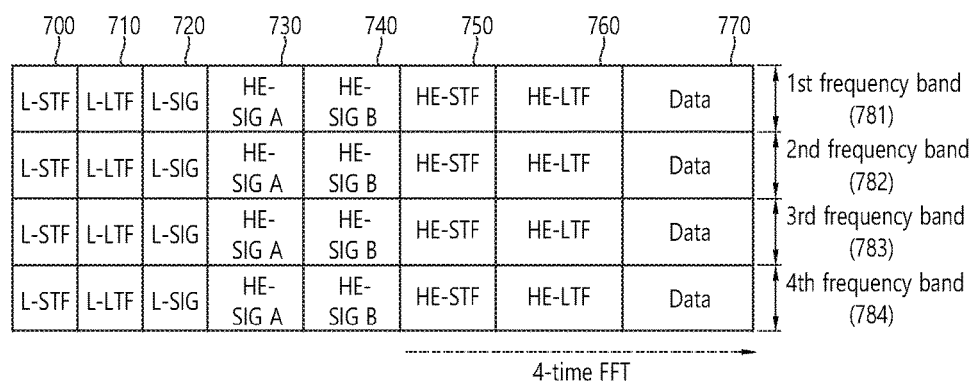
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a format (for example, may be referred to as R-LSIG) may be configured, in which the L-SIG 720 is repeated.

An HE-SIG-A 730 may include the control information common to the receiving station.

In detail, the HE-SIG-A 730 may include information on 1) a DL/UL indicator, 2) a BSS color field of the BSS, 3) a field indicating a remaining time of a current TXOP period, 4) a field indicating an MCS technique applied to the HE-SIG-B, 5) an indication field regarding whether the HE-SIG-B is modulated by a dual subcarrier modulation technique for MCS, 6) a field indicating the number of symbols used for the HE-SIG-B, 7) a field indicating whether the HE-SIG-B is generated in a full band, 8) a field indicating the number of symbols of the HE-LTF, 9) a field indicating the length of the HE-LTF and a CP length, 10) a field indicating whether an OFDM symbol is present for LDPC coding, 11) a field indicating control information regarding packet extension (PE), 12) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
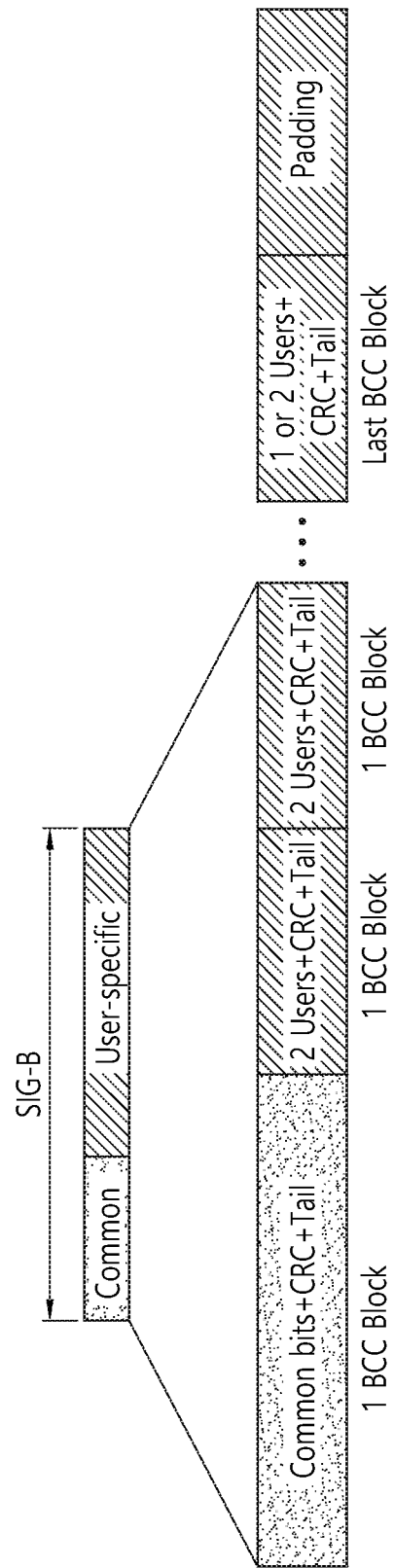
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded with one BCC block. The user-specific field subsequent thereafter may be coded with one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may include even control information for a data field corresponding to the relevant frequency band (that is, the fourth frequency band) and a data field of another frequency band (e.g., a second frequency band) other than the relevant frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

The characteristic that the size of the FFT/IFFT, which is applied to the HE-STF 750 and the field after the HE-STF 750, may be applied to a downlink PPDU and/or uplink PPDU. More specifically, this may be applied to the PPDU shown in FIG. 7 or to an uplink MU PPDU, which will be described later on.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band is the same as the primary band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user, that is, the receiving station may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present invention is applied, the whole bandwidth may be used for downlink transmission to one STA and uplink transmission to one STA. Further, in the wireless LAN system to which the embodiment of the present invention is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, when the uplink transmission by the plurality of respective STAs (e.g., non-AP STAs) is performed on the frequency domain, the AP may allocate the different frequency resources to the plurality of respective STAs as the uplink transmission resources based on the OFDMA. Further, as described above, the different frequency resources may be different subbands (alternatively, sub channels) or different resources units (RUs).

The different frequency resources are indicated through a trigger frame with respect to the plurality of respective STAs.

Figure 9:
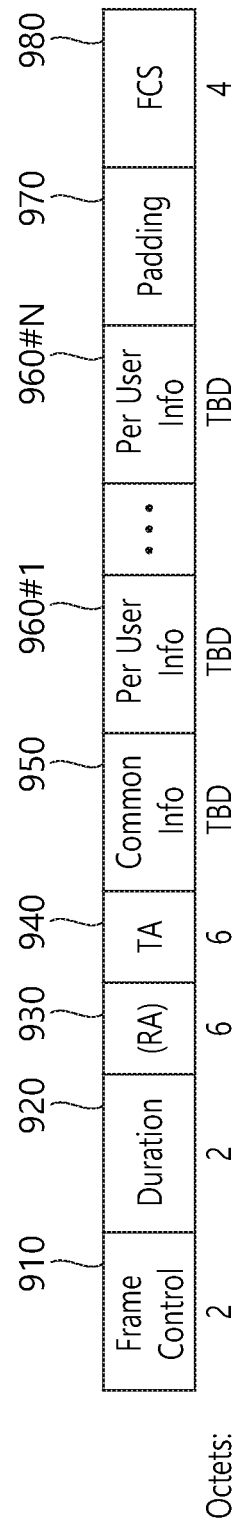
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured of a MAC frame and may be included in the PPDU. For example, the trigger frame may be transmitted through the PPDU shown in FIG. 3, through the legacy PPDU shown in FIG. 2, or through a PPDU, which is specifically designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV, which will be described in detail later on, or information related to an identifier (e.g., AID) of the user equipment.

Additionally, a RA field 930 may include address information of a receiving STA of the corresponding trigger frame, and this field may also be omitted as required. A TA field 940 may include address information of the STA (e.g., AP) transmitting the corresponding trigger frame, and a common information field 950 may include common control information that is applied to the receiving STA receiving the corresponding trigger frame.

Figure 10:
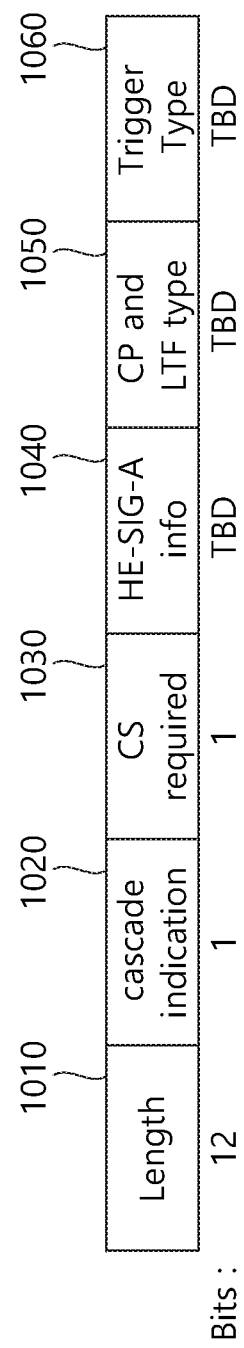
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

As shown in the drawing, the Length field 1010 may be given that same value as the Length field of the L-SIG field of the uplink PPDU, which is transmitted with respect to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted with respect to the corresponding trigger frame.

A CP and LTF type field 1050 may include information on a LTF length and a CP length of the uplink PPDU being transmitted with respect to the corresponding trigger frame. A trigger type field 1060 may indicate a purpose for which the corresponding trigger frame is being used, e.g., general triggering, triggering for beamforming, and so on, a request for a Block ACK/NACK, and so on.

Meanwhile, the remaining description on FIG. 9 will be additionally provided as described below.

It is preferable that the trigger frame includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 11:
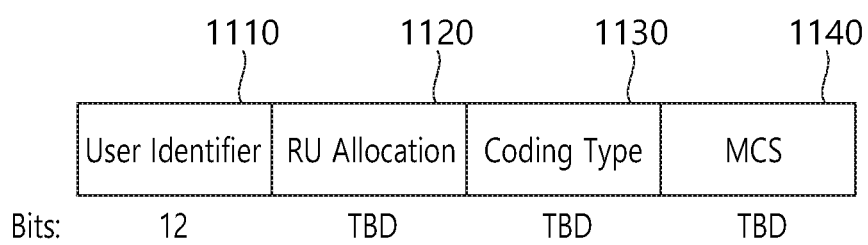
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU with respect to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted with respect to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted with respect to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Figure 12:
FIG. 12 is a block diagram illustrating an example of an uplink MU PPDU.

FIG. 12 is a block diagram illustrating an example of an uplink MU PPDU. The uplink MU PPDU of FIG. 12 may be transmitted with respect to the above-described trigger frame.

As shown in the drawing, the PPDU of FIG. 12 includes diverse fields, and the fields included herein respectively correspond to the fields shown in FIG. 2, FIG. 3, and FIG. 7. Meanwhile, as shown in the drawing, the uplink PPDU of FIG. 12 may not include a HE-SIG-B field and may only include a HE-SIG-A field.

This exemplary embodiment proposes a communication method that is enhanced from the HEW system or the IEEE 802.11ax system. More specifically, the IEEE 802.11ax system is considering the adoption of diverse technical methods in order to achieve an increase in the average throughput to 4 times or more that the legacy 802.11ac system. And, one of the technical adoptions corresponds to the above-described 4×FFT (or 2×FFT, and so on). In this structure, since subcarrier spacing may be reduced to a quarter (¼) as compared to the legacy system, subcarrier spacing may be sensitive to a carrier frequency offset (CFO). Accordingly, it will be preferable to compensate for the residual CFO by using an adequate method.

Additionally, the support of UL MU MIMO and UL OFDMA is also being considered in the 802.11ax, and, in this situation, since different CFOs are mixed with one another for each user at the receiving end, unlike in the conventional single user situation or downlink MU MIMO situation, the conventional CFO estimation method using a pilot may cause difficulty in carrying out an accurate per user CFO estimation.

Accordingly, the exemplary embodiment of the present invention proposes a P matrix coded LTF method, which can simultaneously perform channel estimation and CFO measurement in a UL MU MIMO and/or UL OFDMA transmission situation.

In the related art wireless LAN system, the P matrix (or orthogonal mapping matrix) that is applied to the LTF field was defined as described below.

More specifically, in the 802.11ac system, residual carrier frequency offset (CFO) is measured by using a pilot. Most particularly, the residual CFO may be measured by allocating the same pilot to the same tone (or subcarrier) for each symbol, by configuring the same coefficient, and, then, by measuring the phase difference in the pilot values between the symbols.

Additionally, the channel estimation is performed in the VHT-LTF, and, then, orthogonality between the symbol of the same subcarrier and the stream is created by multiplying the P matrix, and, then, by using the multiplied result, the channel may be estimated. The P matrix may refer to a matrix having orthogonality for each row configuring the corresponding matrix.

In this case, the number of LTF fields and the total number of spatial streams (i.e., space-time streams) may be defined by the relationship shown below in Table 1.

TABLE 1

| Number of streams | 1 | 2 | 3 | 4 | 5 | 6 | 7 | 8 |
|---|---|---|---|---|---|---|---|---|
| Number of LTFs | 1 | 2 | 4 | 4 | 6 | 6 | 8 | 8 |

Meanwhile, the P matrix may be defined as different matrices in accordance with the total number of space-time streams, and the detailed format of the matrix may be as shown below. Most particularly, when the total number of time-space streams is equal to 4 or less, Equation 1 may be used, when the total number of time-space streams is equal to 5 or 6, Equation 2 may be used, and, when the total number of time-space streams is equal to 7 or 8, Equation 3 may be used.

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \langle \text{Equation 1} \rangle$$

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \text{ where} \quad \langle \text{Equation 2} \rangle$$

$$w = \exp(-j2\pi/6)$$

$$P_{8\times 8} = \begin{bmatrix} P_{4\times 4} & P_{4\times 4} \\ P_{4\times 4} & -P_{4\times 4} \end{bmatrix} \quad \langle \text{Equation 3} \rangle$$

For example, in the IEEE 802.11ac system, in case Equation 1 is used in order to configure the VHT-LTF field, a method in which i) a first LTF symbol of a first space-time stream is multiplied by "1", a second LTF symbol is multiplied by "−1", and the remaining two LTF symbols are multiplied by "1", ii) first, second, and fourth LTF symbols of a second space-time stream are multiplied by "1", and a third LTF symbol is multiplied by "−1", iii) first, second, and third LTF symbols of a third space-time stream are multiplied by "1", and a fourth LTF symbol is multiplied by "−1", and iv) second, third, and fourth LTF symbols of a fourth space-time stream are multiplied by "1", and a first LTF symbol is multiplied by "−1", may be used.

1. P Matrix Coded LTF Method

1-A) Generating a HE-LTF Sequence

By generating an orthogonal LTF sequence for each user by using the conventional P matrix (i.e., the matrix used in IEEE 802.11ac), under the assumption that the channel correlation is large in the frequency domain, a new CFO measurement and channel estimation method may be proposed as described below.

Hereinafter, in describing the method for estimating the CFO and channel in accordance with the P matrix coded LTF method, for simplicity in the description, it will be assumed that the number of users participating in the UL MU MIMO and/or UL OFDMA transmission is equal to 2, and it will also be assumed that the P matrix shown in Equation 1 is reused as the P matrix used herein. Additionally, it will be assumed that each user is allocated with one stream.

However, the present invention will not be limited only to the details described in this exemplary embodiment, and, therefore, a different number of users may also participate in the UL MU MIMO and/or UL OFDMA transmission. Moreover, instead of using the existing P matrix, which has already been defined, a new P matrix may also be used. It is preferable that each row of the P matrix is orthogonal to one another. Additionally, even in a case when each user is allocated with one or more streams, the exemplary embodiment of the present invention may be equally applied.

Figure 13:
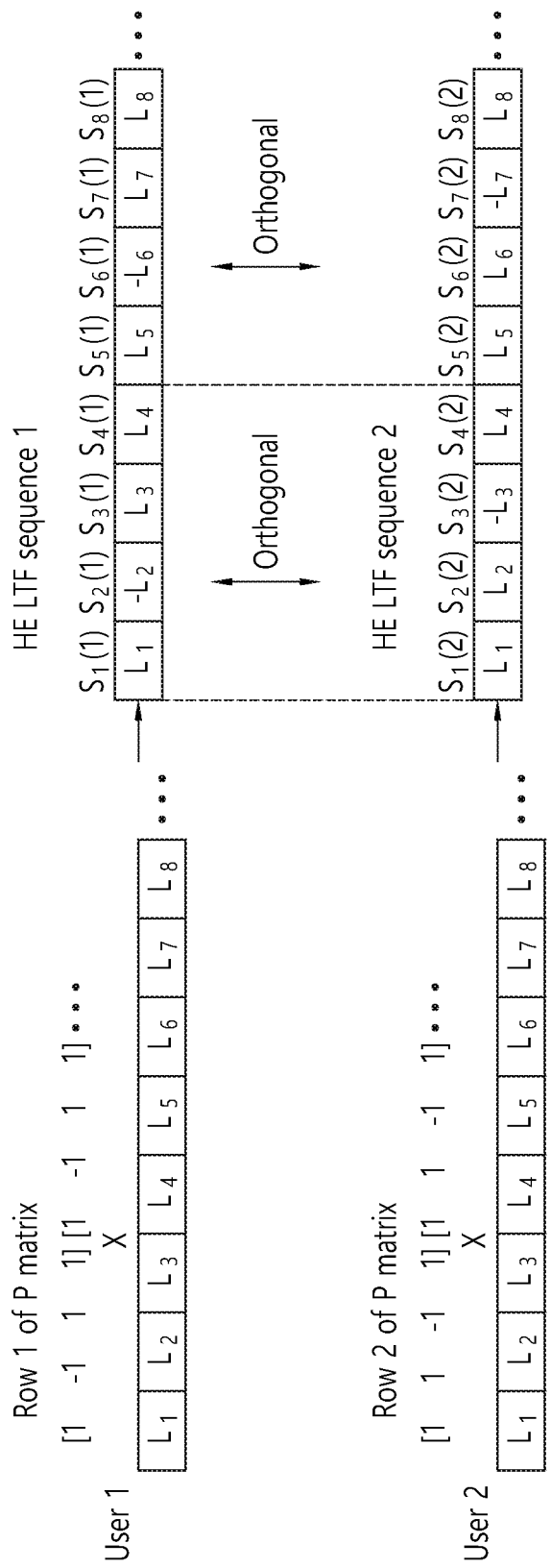
FIG. 13 illustrates an example of a method for generating a HE-LTF sequence according to an exemplary embodiment of the present invention.

FIG. 13 illustrates an example of a method for generating a HE-LTF sequence according to an exemplary embodiment of the present invention.

In FIG. 13, L_i (i.e., L_1, L_2, L_3, . . . ) indicates a common HE-LTF sequence, which is pre-defined. i represents a subcarrier index, to which the HE-LTF is mapped. The pre-defined common HE-LTF sequence (L_i) is scrambled by using different rows of the P matrix (i.e., P matrix code) for each stream.

Most particularly, different rows of the P matrix are multiplied by a matrix element in units of N_f number (e.g., 4, and so on) of sub-sequences of the common HE-LTF sequence, which is pre-defined for each stream. More specifically, sequence elements belonging to the sub-sequence are sequentially multiplied by matrix elements configuring a specific row within the P matrix.

As described above, the scrambled HE-LTF sequence (s_i) is orthogonal for each stream in sub-sequence units of N_f number (e.g., 4, and so on) of consecutive entries. More specifically, the HE-LTF sequence that is scrambled for each stream is piecewise orthogonal.

Referring to FIG. 13, in case of Stream 1, the pre-defined common HE-LTF sequence is multiplied by a matrix element of a first row of the P matrix, thereby generating a (scrambled) HE-LTF sequence (i.e., HE-LTF Sequence 1). And, in case of Stream 2, the pre-defined common HE-LTF sequence is multiplied by a matrix element of a second row of the P matrix, thereby generating a (scrambled) HE-LTF sequence (i.e., HE-LTF Sequence 2).

More specifically, in case of Stream 1, a first HE-LTF sequence element L_1 is multiplied by a first matrix element (i.e., 1) of a first row of the P matrix, a second HE-LTF sequence element L_2 is multiplied by a second matrix element (i.e., −1) of the first row of the P matrix, a third HE-LTF sequence element L_3 is multiplied by a third matrix element (i.e., 1) of the first row of the P matrix, and a fourth HE-LTF sequence element L_1 is multiplied by a first matrix element (i.e., 1) of a fourth row of the P matrix. And, by repeating the above-described procedure on the remaining HE-LTF sequences in units of 4 sequences (i.e., L_5~L_8, L_9~L_12, L_13~L_16, . . . ), the (scrambled) HE-LTF Sequence 1 (s_i(1)) is generated.

Additionally, in case of Stream 2 also, by carrying out the above-described procedure by using a second row of the P matrix, a (scrambled) HE-LTF Sequence 2 (s_i(2)) is generated.

The HE-LTF sequences, which are generated by using the above-described method, are orthogonal for each stream in 4 sub-sequence units. More specifically, HE-LTF Sequence 1 and HE-LTF Sequence 2 are orthogonal in 4 sub-sequence units.

Therefore, in case of the UL MU MIMO and/or UL OFDMA transmission, different HE-LTF sequences may be transmitted for each stream.

1-B) Encoding the P Matrix in the Time Domain

Optionally, in order to maintain orthogonality also in the time domain, P matrix encoding may be additionally applied to the HE-LTF sequences, which are generated by using the above-described Method 1-A).

Figure 14:
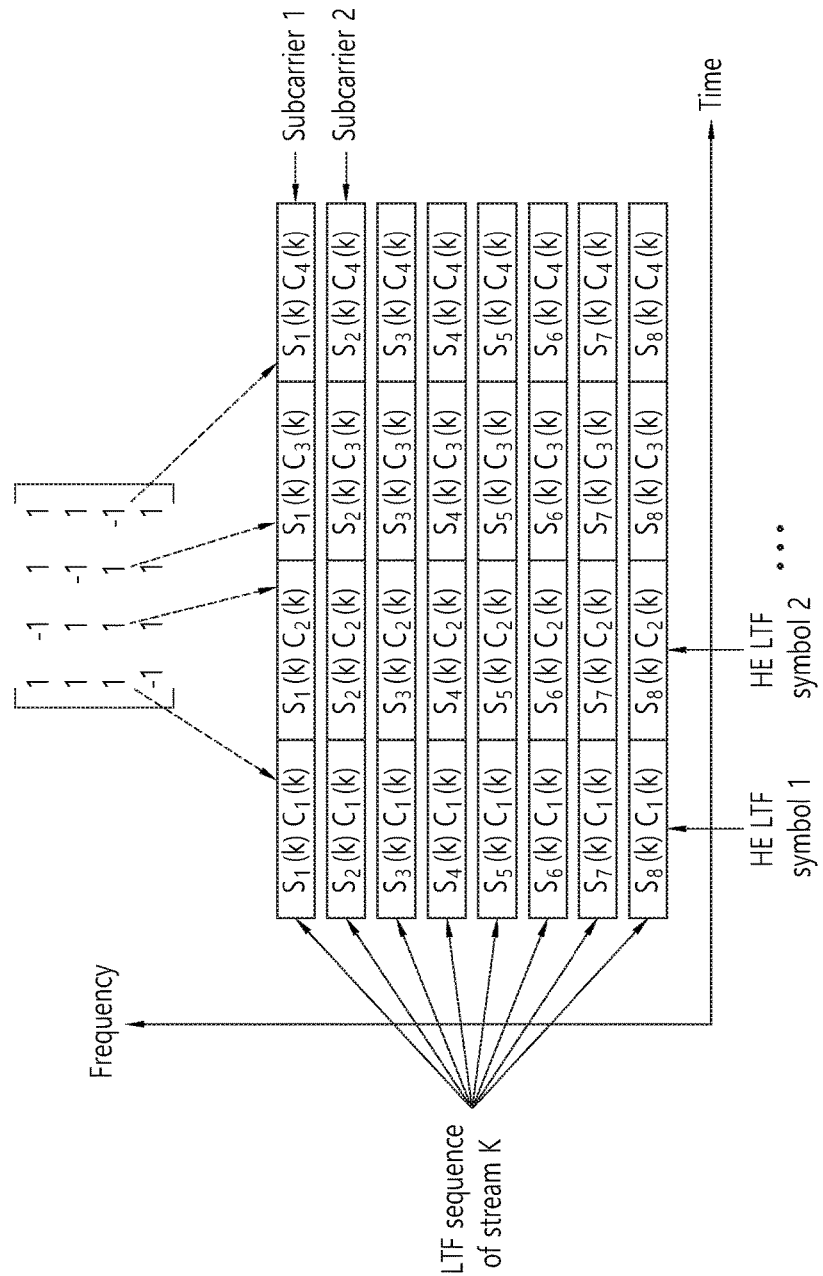
FIG. 14 illustrates another example of a method for configuring a HE-LTF field.

FIG. 14 illustrates another example of a method for configuring a HE-LTF field.

In FIG. 14, c_j(k) (i.e., c_1(k), c_2(k), c_3(k), . . . ) represents a row of the P matrix (i.e., P matrix code) corresponding to Stream k. Herein, k indicates a stream index, and j indicates a symbol index.

The scrambled HE-LTF sequence may be mapped to a sub-carrier of one or more symbols and may then be transmitted, and, at this point, the number of symbols through which the scrambled HE-LTF sequence is transmitted (or mapped) (hereinafter referred to as 'HE-LTF symbol') may be decided by a number of streams being allocated to the UL MU PPDU transmission.

Each of the matrix elements belonging to a row (e.g., a row corresponding to Stream k) of the P matrix is sequentially multiplied by a HE-LTF sequence being transmitted from each symbol. More specifically, data tones of the HE-LTF symbol (i.e., tones to which the HE-LTF sequences are mapped) for each stream are multiplied by different rows of the P matrix.

More specifically, a scrambled HE-LTF sequence (s_i(k)), which is transmitted from a first HE-LTF symbol is multiplied by a first matrix element (i.e., c_1(k)) of a specific row in matrix P, a scrambled HE-LTF sequence (s_i(k)), which is transmitted from a second HE-LTF symbol is multiplied by a second matrix element (i.e., c_2(k)) of a specific row in matrix P, a scrambled HE-LTF sequence (s_i(k)), which is transmitted from a third HE-LTF symbol is multiplied by a third matrix element (i.e., c_3(k)) of a specific row in matrix P, and a scrambled HE-LTF sequence (s_i(k)), which is transmitted from a fourth HE-LTF symbol is multiplied by a fourth matrix element (i.e., c_4(k)) of a specific row in matrix P.

Referring to FIG. 14, a scrambled HE-LTF sequence being mapped to the first HE-LTF symbol is multiplied by the first matrix element (i.e., 1) of a third row of the P matrix, a scrambled HE-LTF sequence being mapped to the second HE-LTF symbol is multiplied by the second matrix element (i.e., 1) of the third row of the P matrix, a scrambled HE-LTF sequence being mapped to the third HE-LTF symbol is multiplied by the third matrix element (i.e., 1) of the third row of the P matrix, and a scrambled HE-LTF sequence being mapped to the fourth HE-LTF symbol is multiplied by the fourth matrix element (i.e., −1) of the third row of the P matrix.

As shown in the example presented above in FIG. 13, by multiplying different rows of the P matrix for each stream in sub-sequence units of the HE-LTF sequence, orthogonality may be maintained in the frequency domain for each stream.

Additionally, as described above, the HE-LTF symbol through which the scrambled HE-LTF sequence is being transmitted may be decided by the number of streams being allocated for the UL MU transmission, and, as shown in the example of FIG. 14, by multiplying the scrambled HE-LTF sequences, which are respectively mapped to each HE-LTF symbol, by different rows of the P matrix for each stream, orthogonality may be maintained in the time domain for each stream.

1-C) CFO and Channel Estimation

Hereinafter, a method for estimating a CFO and channel by using the HE-LTF, which is received from a receiving end (i.e., the AP in case of the UL MU MIMO and/or UL OFDMA transmission), will be described in detail.

A P matrix code respective to a total of K number of streams (i.e., stream index k ($1 \leq k \leq K$)) may be expressed as shown below in Equation 4.

$$c(1)=[1\ 1\ -1\ 1], \ldots, c(k)=[-1\ 1\ 1\ 1] \quad \text{<Equation 4>}$$

In Equation 4, since it is assumed that the P 4×4 matrix is used, as described above, in case each P matrix mode corresponds to a 1×4 matrix, or in case the P matrix corresponds to a K×K matrix, the P matrix code respective to each stream may be configured as a 1×K matrix.

As described above in the example shown in FIG. 14, in case the HE-LTF is being transmitted, a signal Y(1), which is received by the receiving end from Stream 1 through N_f number (e.g., 4 and so on) of sub-carriers and N_p number of symbols (i.e., HE-LTF symbols), may be expressed as shown below in Equation 5.

<Equation 5>

$$Y(1) = \begin{bmatrix} s_1(1)c_1(1)h_1(1)e^{j\theta(1)} & s_1(1)c_2(1)h_1(1)e^{j2\theta(1)} & \cdots & s_1(1)c_{N_p}(1)h_1(1)e^{jN_p\theta(1)} \\ s_2(1)c_1(1)h_2(1)e^{j\theta(1)} & s_2(1)c_2(1)h_2(1)e^{j2\theta(1)} & \cdots & s_2(1)c_{N_p}(1)h_2(1)e^{jN_p\theta(1)} \\ \vdots & \vdots & \ddots & \vdots \\ s_{N_f}(1)c_1(1)h_{N_f}(1)e^{j\theta(1)} & s_{N_f}(1)c_2(1)h_{N_f}(1)e^{j2\theta(1)} & \cdots & s_{N_f}(1)c_{N_p}(1)h_{N_f}(1)e^{jN_p\theta(1)} \end{bmatrix}$$

$$= \text{diag}(h(1))\ s(1)\ c(1)\ \text{diag}([e^{j\theta(1)} \ldots e^{jN_p\theta(1)}])$$

Time ← / Freq ↓

In Equation 5, h_i(k) (i.e., h_1(k), h_2(k), h_3(k), . . . ) represents a channel passing through the transmitting end to the receiving end.

Additionally, jθ(k) (i.e., θ(k), 2θ(k), 3θ(k), . . . ) indicates a phase of the signal received from each HE-LTF symbol. Herein, jθ(k) excludes j, which indicates a complex number in Equation 6, and, herein, j represents a symbol index. More specifically, in the time domain, in a second HE-LTF symbol, the CFO is increased to 2 times that of the first HE-LTF symbol, and, in a third HE-LTF symbol, the CFO is increased to 3 times that of the first HE-LTF symbol.

More specifically, the signal that is transmitted by the transmitting end is transmitted to the receiving end by passing through a channel, and, in this case, since a phase difference occurs for each symbol, the signal Y(1) that is received from Stream 1 may be expressed by using a channel h(1), a scrambled HE-LTF sequence S(1), a P matrix code C(1), and a phase multiplication [e^jθ(1), e^j2θ(1), . . . , e^jN_pθ(1)].

Herein, a channel diagonal matrix diag(h(1)) may be expressed as a N_f×N_f matrix, s(1) may be expressed as a N_f×1 matrix, c(1) may be expressed as a 1×N_p matrix, and a phase diagonal matrix [e^jθ(1), e^j2θ(1), . . . , e^jN_pθ(1)] may be expressed as a N_p×N_p matrix. Accordingly, the signal Y(1) that is received in Stream 1 from the receiving end may be expressed as a N_f×N_P matrix. More specifically, in Equation 5, the row direction may indicate a time axis, and the column direction may indicate a frequency axis.

When signals, which are received from a total of K number of streams, are superimposed, this may be expressed as shown below in Equation 6.

$$Y = \Sigma_k \text{diag}(h(k))s(k)c(k)\text{diag}([e^{j\theta(k)} \ldots e^{jn_p\theta(k)}]) \quad \text{<Equation 6>}$$

Figure 15:
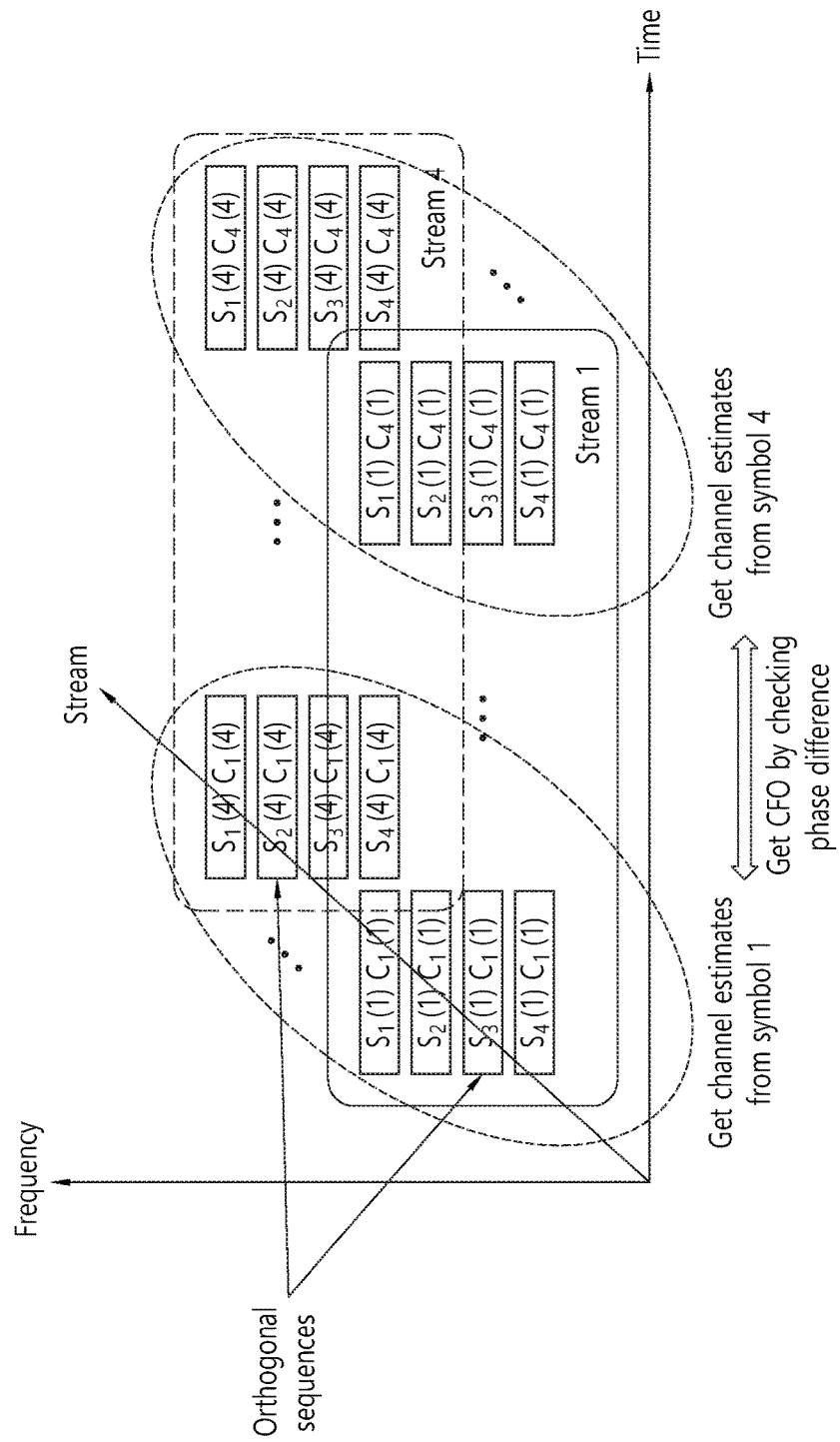
FIG. 15 illustrates an exemplary method for estimating a CFO according to an exemplary embodiment of the present invention.

FIG. 15 illustrates an exemplary method for estimating a CFO according to an exemplary embodiment of the present invention.

Referring to FIG. 15, as described above in FIG. 13, since the HE-LTF sequence is multiplied by different P matrix codes in units of N_f number of consecutive sub-carriers and then scrambled, the HE-LTF sequence of each stream configure an orthogonal sequence between one another in units of N_f number of sub-carriers.

The channel in all N_f number (e.g., 4 and so on) of consecutive subcarriers may be roughly unchanged (i.e., correlated). Therefore, in the receiving end, under the assumption that the channel correlation in all of the N_f number (e.g., 4 and so on) of consecutive subcarriers is high, a channel may be estimated from each HE-LTF symbol from which the HE-LTF is transmitted.

Conversely, due to the CFO, the channel may be diversely varied in the time domain. Accordingly, the receiving end checks the phase difference of the signal (i.e., HE-LTF sequence) transmitted from the HE-LTF symbol and, then, the receiving end estimates the CFO.

More specifically, the receiving end first removes the scrambled HE-LTF sequence and the P matrix code from the signal, which is received through the N_f number of consecutive subcarriers from the HE-LTF symbol t for each stream.

Referring to Stream 1, as shown below in Equation 7, the receiving end removes the HE-LTF sequence and the P matrix code from signal Y(1) of Stream 1, which is received through the N_f number of consecutive sub-carriers from the HE-LTF symbol t.

$$c_t^*(1)s^H(1)Y_{:,t}=e^{jt\theta(1)}\Sigma_{f=1}^N \tilde{h}_f(1)+c_t^*(1)s^H(1)\Sigma_{k\neq 1}c_t(k)$$
$$e^{jt\theta(k)}\text{diag}(h(k))s(k) \qquad \text{<Equation 7>}$$

where $t=1, \ldots, N_P$

In Equation 7, $c^*\_t(k)$ represents a conjugate transpose matrix) (wherein k is a stream index) of the P matrix code respective to Stream k, and $s\hat{}H(k)$ represents a transpose matrix (wherein k is a stream index) of a scrambled HE-LTF sequence respective to Stream k.

In Equation 7, when it is assumed that the channel has a high correlation throughout N_f subcarriers, this may be calculated as shown below in Equation 8.

$$c_t^*(1)s^H(1)Y = N_f e^{jt\theta(1)}\tilde{h}(1) + c_t^*(1)\sum_{k\neq 1}c_t(k)e^{jt\theta(k)}\tilde{h}(k)\underbrace{s^H(1)s(k)}_{=0}$$
$$= N_f e^{jt\theta(1)}\tilde{h}(1) \qquad \text{<Equation 8>}$$

$$\text{where } \tilde{h}(k) = \sum_{f=1}^{N_f} h_f(k)$$

In Equation 8, since the HE-LTF sequence, which is scrambled for each stream, is orthogonal in units of N_f number of subcarriers, the result of $S\hat{}(1)\times s(k)(k\neq 1)$ is equal to '0', and, herein, the signal elements of all of the other streams excluding Stream 1 are removed.

When the above-described method is identically performed with respect to the signals received from each stream, the signal element being transmitted from all of the other streams excluding the corresponding stream may be removed from a specific HE-LTE symbol.

Additionally, for each HE-LTF symbol, the receiving end may deduce a phase rotation from a specific HE-LTF symbol as shown below in Equation 9.

$$\varphi_t(k)=\text{phase}(e^{jt\theta(k)}\tilde{h}(k)) \qquad \text{<Equation 9>}$$

And, the CFO may be estimated from a phase difference between the HE-LTF symbols, as shown below in Equation 10, based on the value deduced from Equation 9.

$$\hat{\theta}(k) = \frac{E\{\varphi_{N_F}(k) - \varphi_1(k)\}}{N_P - 1} \qquad \text{<Equation 10>}$$

Based on the phase difference between the HE-LTF symbols, which is deduced from Equation 10, a CFO correction term is deduced as shown below in Equation 11.

$$\frac{1}{N_P}\sum_{t=1}^{N_P} e^{jt\hat{\theta}(k)} \qquad \text{<Equation 11>}$$

More specifically, as shown in FIG. 11, the receiving end deduces a CFO estimation value for each stream.

Additionally, by applying a value that is deduced in Equation 12 to Equation 9, which is presented above, the receiving end may estimate a channel (i.e., deduce a channel estimation value $\tilde{h}(k)$) for each HE-LTF symbol with respect to each stream.

Figure 16:
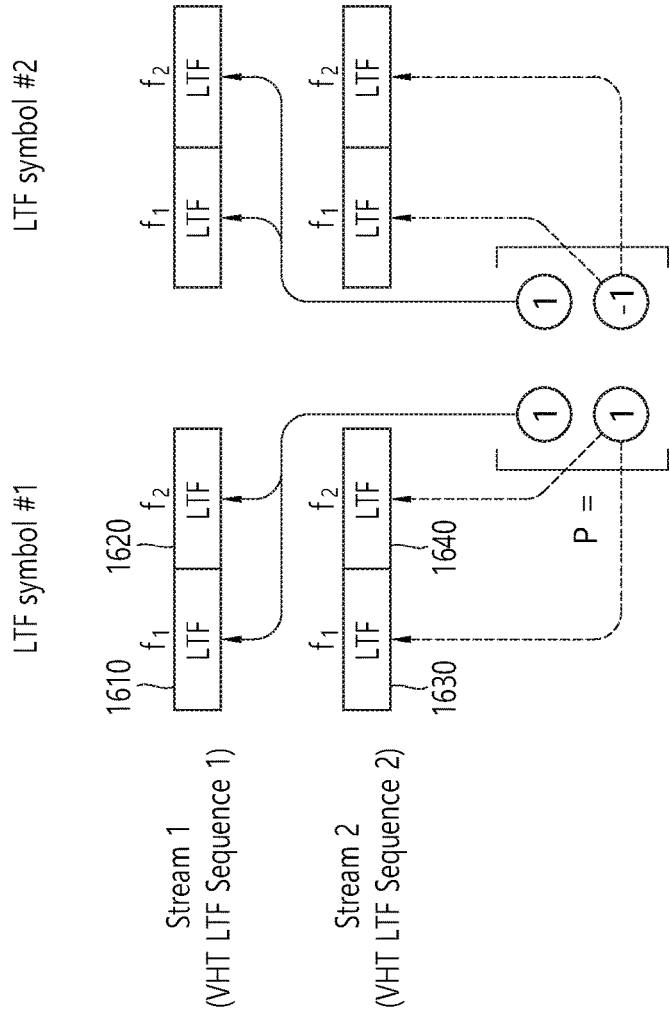
FIG. 16 and FIG. 17 show a comparison between the related art method for generating a LTF field and a method for generating a LTF field according to an exemplary embodiment of the present invention.
Figure 17:
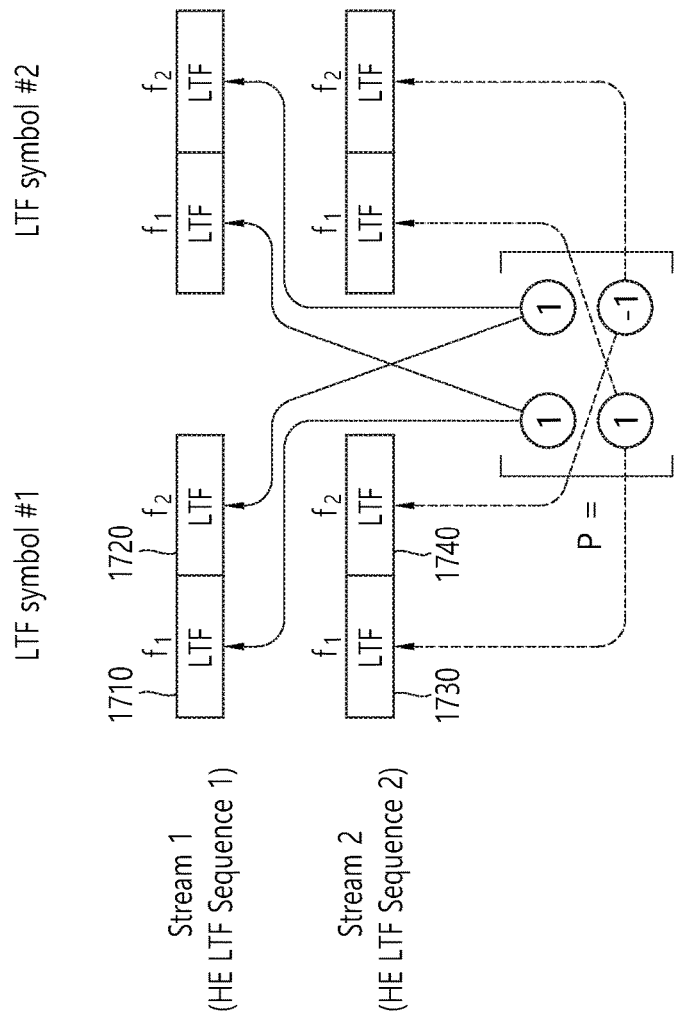

FIG. 16 and FIG. 17 show a comparison between the related art method for generating a LTF field and a method for generating a LTF field according to an exemplary embodiment of the present invention.

In FIG. 16 and FIG. 17, for simplicity in the description, a case when a P matrix of 2×2 is used, when two space-time streams are allocated, and when two LTF symbols are generated, will be described herein. As shown in FIG. 16, in the related art IEEE 802.11ac system, if the P matrix of 2×2 is used, a LTF sequence 1610 corresponding to a first sub-carrier (f1) and a LTF sequence 1620 corresponding to a second sub-carrier (f2) may both be multiplied by the same matrix element "1". During the related art procedure for generating the VHT sequence, the P matrix was multiplied without considering the orthogonality between the streams (i.e., Stream 1 and Stream 2) within the frequency domain. In other words, since the LTF streams 1610 and 1620 corresponding to the first stream (Stream 1) and the LTF streams 1630 and 1640 corresponding to the second stream (Stream 2) are all multiplied by the same matrix element "1", the orthogonality could not be ensured.

Conversely, when using the method for generating the LTF symbol according to the exemplary embodiments of the present invention shown in FIG. 13 and FIG. 14, the P matrix may be applied as shown in FIG. 17.

More specifically, a result may occur in that a LTF sequence 1710 corresponding to the first stream (Stream 1) and a first sub-carrier (f1) and a LTF sequence 1720 corresponding to the first stream (Stream 1) and a second sub-carrier (f2) are both multiplied by a sequence of [1, 1], whereas LTF sequences 1730 and 1740 corresponding to the second stream are multiplied by a sequence of [1, −1]. In other words, the P matrix may be multiplied as a method for ensuring orthogonality between the streams within the frequency domain.

In other words, in case of using the method according to the exemplary embodiment of the present invention, since the rows of the P matrix are orthogonal to one another, it will be easier for the receiving end to extract a signal of a specific sequence. However, in case of using the method shown in FIG. 17 (or FIG. 18), the related art cyclic shift delay (CSD) method may be required to be changed.

More specifically, for the cyclic shift being applied with respect to the related art VHT PPDU, different cyclic shift values were applied with respect to each stream. For example, a θ_1 value (e.g., this may be equal to "0") may be applied with respect to the first stream, and a θ_2 value (more specifically a value different from θ_1) may be applied with respect to the second stream. In this case, according to the related art CSD method, the CSD was applied by using a method of applying e^(jθ_1) with respect to a first frequency tone and applying e^(jθ_1*2) with respect to a second frequency tone. Referring to the case shown in FIG. 17, the cyclic shift value respective to the first stream is different from the cyclic shift value respective to the second stream, and, even in case of using the same first stream, the cyclic shift value being applied to the LTF sequence 1720 corresponding to the second sub-carrier (f2) may be linearly increased as compared to the cyclic shift value being applied to the LTF sequence 1710 corresponding to the first sub-carrier (f1).

The above-described method of FIG. 17 may be used only for the uplink MU PPDU. More specifically, the method of FIG. 16 may be used for another type of PPDU, and, in case of generating the uplink MU PPDU shown in FIG. 12, the method of FIG. 17 may be used.

Figure 18:
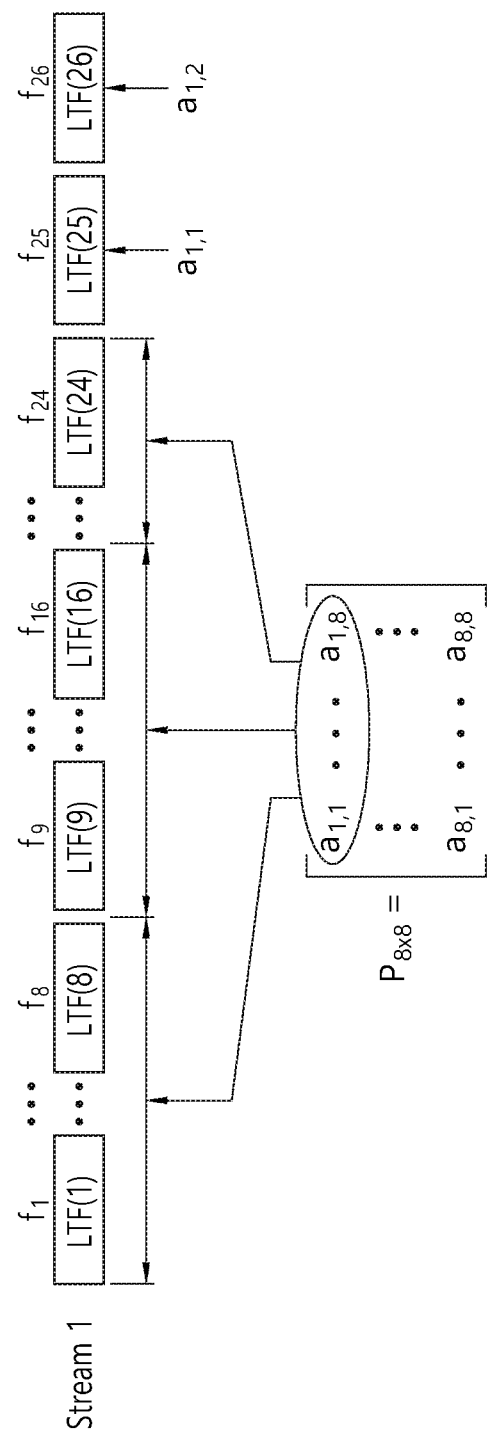
FIG. 18 illustrates the example of FIG. 17 in more detail.

FIG. 18 illustrates the example of FIG. 17 in more detail. As shown in the drawing, a LTF sequence having 26 elements with respect to the first stream may be used, and each element may correspond to a different frequency band. In this case, diverse matrices may be used as the P matrix. More specifically, diverse types of matrices ensuring orthogonality between each matrix may be used. For example, the matrix of Equation 3 may be used.

In this case, first to eighth elements of the LTF sequence are multiplied by 8 elements of a row (i.e., a_(1,1) to a_(1,8)) corresponding to the first stream of the P matrix. More specifically, the first element (i.e., LTF(1)) of the LTF may be multiplied by the element a_(1,1) of matrix P, and the second element of (i.e., LTF(2)) of the LTF may be multiplied by the element a_(1,2).

It is preferable that such operation is repeated in length units of the P matrix. More specifically, each of the 8 elements of the LTF sequence may be multiplied by the first row of the P matrix.

If the LTF sequence corresponding to the first sequence is not divisible by 8, the last M number of elements of the LFT sequence may be multiplied by the first M number of elements of the row corresponding to the P matrix. In other words, it is preferable that the last two elements of the LTF sequence (i.e., LTF(25), LTF(26)) are multiplied by the first two elements (i.e., element a_(1,1) and element a_(1,2)) of the row corresponding to matrix P.

Such multiplication may also be expressed by using the term masking. Accordingly, the above-described operation for generating a HE-LTF sequence for uplink MU-MIMO may be expressed as described below. For each stream, a LTF sequence can be masked repeatedly in a piece-wise manner by a distinct row of an 8×8 orthogonal matrix. When the length of the LTF sequence is not divisible by 8, the last M elements of the LTF sequence can be masked by the first M elements of the orthogonal matrix row.

If the related art CSD method is applied to the example of FIG. 17 and/or FIG. 18, the orthogonality between the space-time streams ensured by method of applying the P matrix may no longer be maintained. Accordingly, in case of applying the P matrix in accordance with the example of FIG. 17 and/or FIG. 18, it is preferable to apply a new CSD method.

Figure 19:
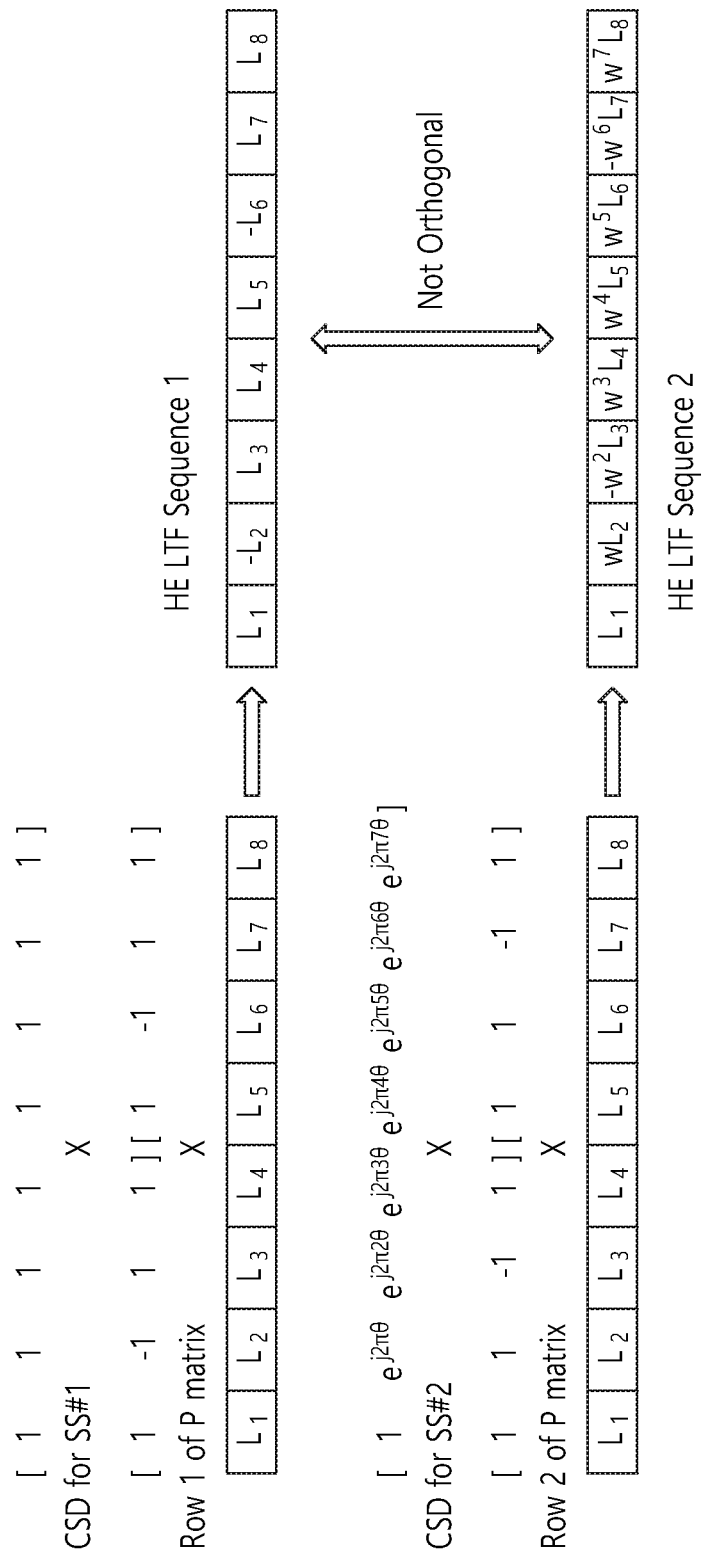
FIG. 19 describes a situation where orthogonality is not maintained between space-time streams, in a case when the related art CSD method is applied.

FIG. 19 describes a situation where orthogonality is not maintained between space-time streams, in a case when the related art CSD method is applied.

FIG. 19 shows an example, wherein a P matrix of 4×4 is used, and wherein matrix elements of different rows of the P matrix are multiplied in units of N_f number (e.g., 4) of sub-sequences of the HE-LTF sequence. As described above, in an upper left part of FIG. 19 (i.e., first stream), [1, −1, 1, 1], which corresponds to a first column of matrix P, is multiplied, whereas, in a lower left part of FIG. 19 (i.e., second stream), [1, 1, −1, 1], which corresponds to a second column of matrix P, is multiplied, and, accordingly, the orthogonality is ensured between the stream within the frequency domain. However, according to the related art CSD method, the cyclic shift value of "0" may be applied with respect to the first stream, and "θ" may be applied with respect to the second stream. And, in this case, each cyclic shift value is linearly increased along the frequency axis. More specifically, the cyclic shift values being applied to the second stream are linearly increased by the order of [1, e^j2πθ, e^j2π2θ, e^j2π3θ . . . ]. And, as a result, as shown in the right part of FIG. 19, the orthogonality between the streams is not maintained. In other words, since the related art CSD method corresponds to a method wherein the cyclic shift values are linearly increased, the orthogonality between the LTF sequences cannot be maintained.

Hereinafter, in case the related art CSD method is being applied, the exemplary embodiment of the present invention proposes diverse methods that can resolve the problem of failing to maintain the orthogonality between the space-time streams.

First of all, in order to maintain the orthogonality between the streams, the present invention proposes a method of applying the CSD is block units.

Figure 20:
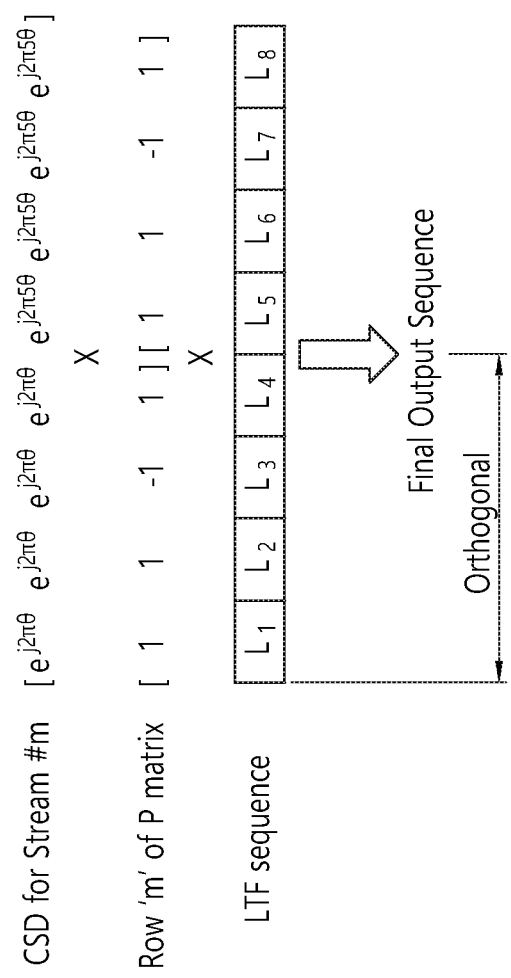
FIG. 20 illustrates an example of applying a CSD in block units.

FIG. 20 illustrates an example of applying a CSD in block units. FIG. 20 is applicable to the above-described uplink MU PPDU. More specifically, as described above, in a situation where the orthogonality between the streams (e.g., orthogonality between different streams respective to the same user or orthogonality between streams of different users) is maintained, the method for applying CSD with respect to the uplink MU PPDU will be hereinafter be described.

As shown in the drawing, it is preferable to configure a length unit of 4 as one block and to configure the cyclic shift value within one block to be applied as one identical cyclic shift value that does not increase linearly. More specifically, as shown in the drawing, it is preferable that a first block is configured with respect to the initial 4 LTF sequences corresponding to Tone Index 1 to Tone Index 4, and that a second block is configured with respect to the next 4 LTF sequences, and that the same cyclic shift value is configured for each block. Referring to the example shown in FIG. 20, according to the related art method, [e^j2πθ, e^j2π2θ, e^j2π3θ, e^j2π4θ, e^j2π5θ, e^j2π6θ, e^j2π7θ, e^j2π8θ] may be applied. However, by using the method, such as [e^j2πθ, e^j2πθ, e^j2πθ, e^j2πθ, e^j2π5θ, e^j2π5θ, e^j2π5θ, e^j2π5θ], 4 sequence-unit blocks may be configured.

Evidently, the cyclic shift value being applied to the second block is not required to be equal to 5θ, and, instead, the cyclic shift value being applied to the first block may simply be equal to 2θ or n*θ.

The size of the block may be identical to the number of columns in the P matrix or may be configured based on the number of columns of the P matrix or may be configured to be the same as N_f. Additionally, the size of the block may be decided in accordance with the total number of users. For example, as shown in FIG. 20, in case a 4×4 P matrix is used, a block may be configured based on a length unit of 4. In case a 8×8 P matrix is used, a block may be configured based on a length unit of 4 or 8. Additionally, in case the total number of users is equal to or less than a predetermined number (e.g., 4), the length unit of 4 may be used, and, in case the total number of users exceeds the predetermined number, the length unit of 8 may be used. More specifically, in case the number of users ranges from 5 to 8, the tone block may be divided into length units of 8.

The two HE LTF sequences shown in FIG. 20 may respectively correspond to a space-time stream that is used by different users, or may respectively correspond to two space-time streams that are used by a single user.

Meanwhile, in case a specific length unit is used, a case when the entire LTF sequences cannot be covered may occur. The processing of this case will hereinafter be described in detail.

Figure 21:
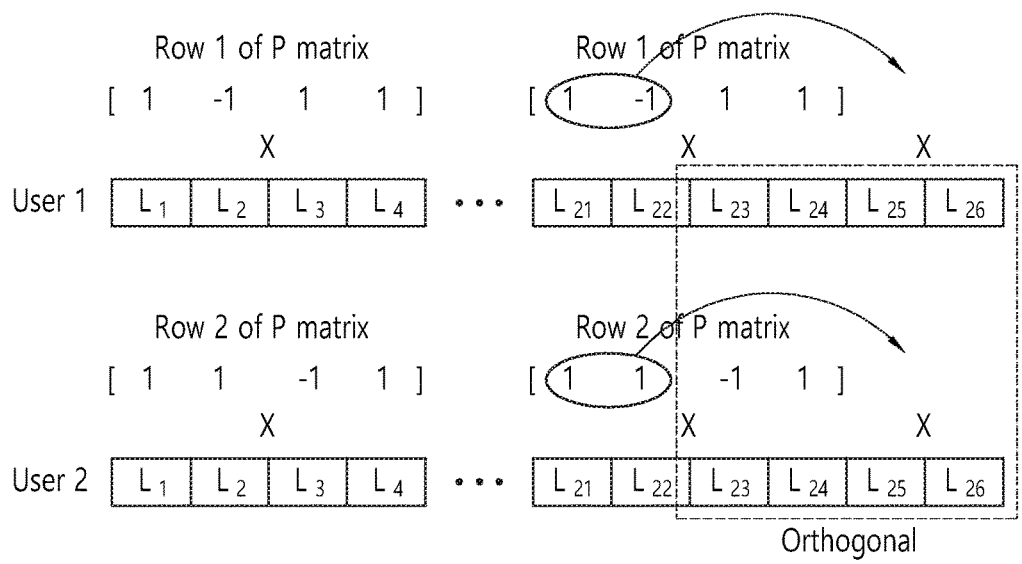
FIG. 21 describes an example of applying a CSD with respect to a tone that remains after performing blocking.

FIG. 21 describes an example of applying a CSD with respect to a tone that remains after performing blocking. As shown in the drawing, the LTF sequence may correspond to 26 tones (i.e., L1 to L26). More specifically, in case an LTF that corresponds to 26-RU, which is described above in FIG. 4 to FIG. 6, is generated, an LTF field corresponding to the 26 tones may be generated. In this case, if a block is configured based on the length unit of 4, the method of FIG. 21 may be applied as the method for applying CSD with respect to the last two tones (i.e., L25 to L26).

More specifically, as shown in FIG. 21, another orthogonal tone block may be generated by using the cyclic orthogonality of the P matrix. More specifically, a [1, −1] sequence that corresponds to L21 and L22, as shown in FIG. 21, may be applied once again to L25 and L26. In this case, as shown in FIG. 21, orthogonality may be ensured between L1 to L24 of the LTF sequences corresponding to the first user (User 1) and L1 to L24 of the LTF sequences corresponding to the second user (User 2). Additionally, orthogonality is also ensured within a frequency tone corresponding to L23 to L26.

As described above, if masking was performed on the LTF sequence by using the cyclic orthogonality of the P matrix on the remaining (or residual) tones (i.e., tones corresponding to L25 and L26), the CSD application may be carried by using the following method.

For the remaining tones (i.e., tones corresponding to L25 and L26), a multiple of the CSD applied to the previous tone block may be applied. Accordingly, the cyclic orthogonality of the P matrix may be used. For example, as shown in FIG. 21, in case the P matrix having the length of 4 is applied, the tone block unit is equal to 4, and the same multiple of the CSD is applied to the [1-4], [5-8], ..., [21-24] tone blocks, and, accordingly, tones 25 and 26 remain. At this point, a multiple of the CSD applied to the [21-24] tone block is applied to the two remaining tones 25 and 26, and, accordingly, configuration is made so that orthogonality can be ensured between the two masked LTF sequence [23-26] tones.

In addition to the above-described method, additional methods may also be used. More specifically, a new multiple of the CSD may be applied to the remaining tones. In this case, orthogonality is not always ensured with respect to the LTF sequences of the remaining tones. Therefore, the present invention proposes a method of additionally masking the P matrix, which fits the length of the remaining tones, and, accordingly, the orthogonality may be ensured. For example, if a P matrix (i.e., 2×2 matrix) having the length of 2 is applied to the tones 25 and 26, and if the CSD is applied by dividing the tone block, to which the same multiple of the CSD is applied for each unit, to [1-4], [5-8], ..., [21-24], [25-26], the LTF sequence of the two users may always be orthogonal in all of the tone blocks.

Figure 22:
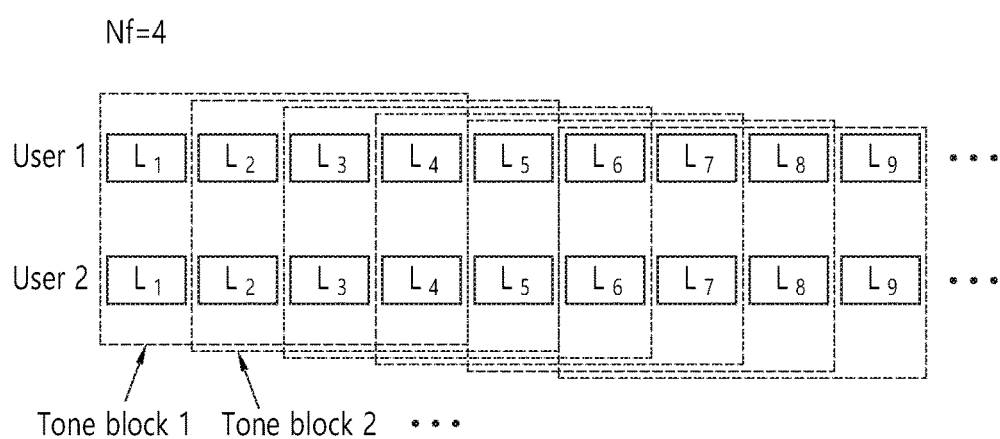
FIG. 22 illustrates another example of applying a CSD according to an exemplary embodiment of the present invention.

FIG. 22 illustrates another example of applying a CSD according to an exemplary embodiment of the present invention.

The example of FIG. 22 proposes a method of applying the same multiple of the CSD to each stream. More specifically, instead of applying the cyclic shift value as the block unit, the same cyclic shift value may be applied with respect to the same stream regardless of the frequency tone. For example, the two streams (each corresponding to L1 to L9) shown in FIG. 22 may correspond to different users User 1 and User 2. In this case, a CSD configured to have a cyclic shift value of "0" may be applied to all of the tones of User 1, and a CSD respective to a predetermined value "θ" may be applied to all of the tones of User 2 (n*θ may also be applied). Thus, orthogonality of the LTF sequence for each user is always maintained regardless of the CSD. Accordingly cyclic orthogonality of the P matrix may be additionally used, and, by using the cyclic orthogonaility, a more enhance performance in channel estimation or CFO estimation may be ensured.

As described above, the above-described method of applying the CSD or the method of repeatedly multiplying the LTF sequence by the P matrix may be used for the uplink MU PPDU. In this case, if multiple streams respective to each of the multiple users are used, how to decide the cyclic shift value (i.e., CSD value) with respect to each stream should be decided.

For example, Stream 1 and Stream 2 may be allocated with respect to User 1, and Stream 3 and Stream 4 may be allocated with respect to User 2. In this case, it is preferable to allocate a global index for each user, and, then, to allocate θ1 and θ2 with respect to each stream of User 1 and to allocate θ3 and θ4 with respect to each stream of User 2.

More specifically, it is preferable to allocate different global indexes to all of the streams that are allocated to each user and to allocate different CSD values in accordance with each global index.

For the user, in case of receiving a trigger frame shown in FIG. 9, the number of users participating in the uplink MU transmission and the total number of streams may be known, and the user may check which global index is being allocated with respect to the stream that is allocated to the corresponding user. Accordingly, each user may apply a CSD value in accordance with the global index respective to each stream, and, as a result, each of the streams being allocated to multiple users may be differentiated from one another in accordance with the CSD value.

Figure 23:
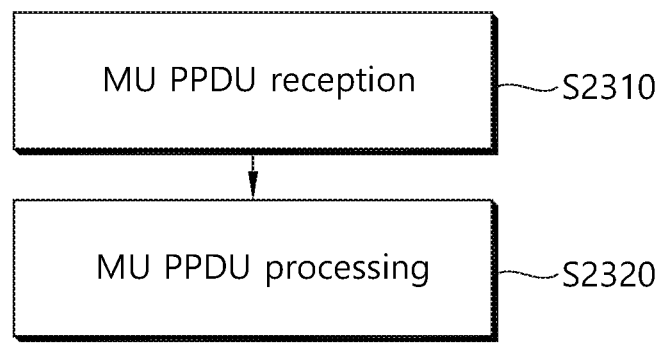
FIG. 23 is a flow chart of a procedure according to an exemplary embodiment of the present invention.

FIG. 23 is a flow chart of a procedure according to an exemplary embodiment of the present invention.

In step S2310, the AP receives multiple MU PPDUs from multiple users. For example, the AP may receive a first uplink MU PPDU from a first user and may receive a second uplink MU PPDU from a second user.

In step S2320, the multiple MU PPDUs that are received by the AP are processed. More specifically, decoding of the MU PPDUs is performed, and, when the recovery of a physical layer signal is completed, the related information is delivered to a higher layer.

Each of the first and second MU PPDUs that are received through step S2310 may correspond to at least one stream. For example, a first uplink MU PPDU may correspond to at least one stream, and this is the same for a second uplink MU PPDU. Each of the streams may correspond to a stream shown in FIG. 13 to FIG. 22 or to a LTF sequence.

The first and second MU PPDUs being received through step S2310 respectively includes first and second LTF signals. More specifically, a first uplink MU PPDU includes the LTF signal shown in FIG. 12, and this is the same for the second uplink MU PPDU. Additionally, each of the first and second LTF signals is generated by using a method wherein an orthogonal mapping matrix and CSD are applied to a predetermined LTF sequence. More specifically, an orthogonal mapping matrix (i.e., Matrix P) may be multiplied according to the method shown in FIG. 17 and FIG. 18, and a CSD application method according to FIG. 19 to FIG. 22 or a CSD application method according to IEEE 802.11ac may be used.

In this case, it is preferable that a first CSD value that is allocated to the first LTF signal is different from a second CSD value that is allocated to the second LTF signal. Most particularly, a per-stream CSD value that is allocated to the first LFT signal and a per-stream CSD value that is allocated to the second LFT signal may be decided based on a global stream index.

More specifically, as described above, in case Stream 1 and Stream 2 are allocated for User 1, and in case Stream 3 and Stream 4 are allocated for User 2, global stream indexes respective to each stream may be sequentially allocated as Global Stream Index 1 to Global Stream Index 4. More specifically, the global stream indexes may be differently decided with respect to all of the streams corresponding to the first uplink MU PPDU and all of the streams corresponding to the second uplink MU PPDU. And, the per-stream CSD value respective to User 1 may be decided in accordance with Global Stream Index 1 and Global Stream Index 2, and the per-stream CSD value respective to User 2 may be decided in accordance with Global Stream Index 3 and Global Stream Index 4. As a result, θ1 and θ2 may be allocated with respect to each stream of User 1, and θ3 and θ4 may be allocated with respect to each stream of User 2.

In case an orthogonal mapping matrix is applied to a pre-determined LTF sequence, the LTF sequence may be repeatedly multiplied by each row of the orthogonal mapping matrix in length units of the row of the orthogonal mapping matrix. For example, in case an orthogonal mapping matrix having a row length equal to "8" is applied to the uplink MU PPDU, as shown in FIG. 18, the LTF sequence may be repeatedly multiplied by each row in units of 8.

Although FIG. 23 illustrates a procedure flow chart, which is described in the viewpoint of the AP, it will be apparent that this exemplary embodiment is also applicable to a non-AP STA. More specifically, the non-AP STA may decide a CSD value that the corresponding non-AP STA can use, and, then, the non-AP STA may generate a LTF signal by using a method of applying the decided CSD value to the LTF, and, then, the non-AP STA may perform uplink transmission by using a method of including the corresponding LTF signal to an uplink MU PPDU. In this case, as described above, the CSD value may be decided based on the global stream index, and the above-described matrix of 8×8, and so on, may be used as the P matrix.

Figure 24:
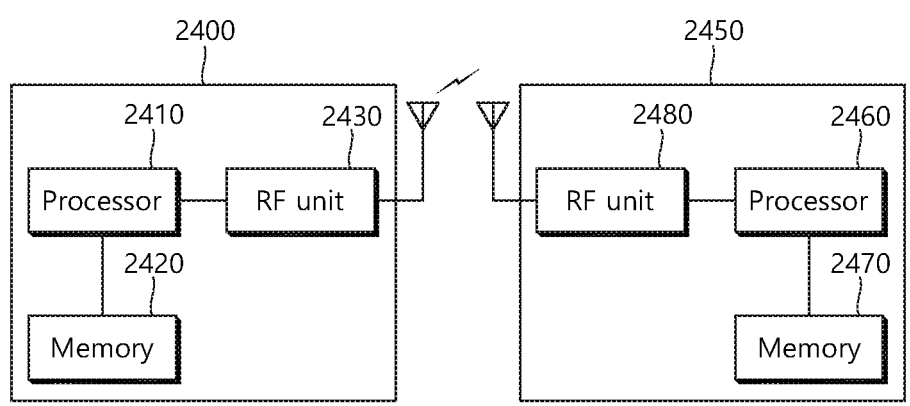
FIG. 24 is a block diagram showing a wireless communication system in which the exemplary embodiment of the present invention can be applied.

FIG. 24 is a block diagram showing a wireless communication system in which the exemplary embodiment of the present invention can be applied.

Referring to FIG. 24, as a station (STA) that can realize the above-described exemplary embodiment, the wireless device may correspond to an AP or a non-AP station (non-AP STA). The wireless device may correspond to the above 0 described user or may correspond to a transmitting device transmitting a signal to the user.

The AP 2400 includes a processor 2410, a memory 2420, and a radio frequency unit (RF unit) 2430.

The RF unit 2430 is connected to the processor 2410, thereby being capable of transmitting and/or receiving radio signals.

The processor 2410 implements the functions, processes, and/or methods proposed in this specification. For example, the processor 2410 may be realized to perform the operations according to the above-described exemplary embodiments of the present invention. More specifically, the processor 2410 may perform the operations that can be performed by the AP, among the operations that are disclosed in the exemplary embodiments of FIG. 1 to FIG. 23.

The non-AP STA 2450 includes a processor 2460, a memory 2470, and a radio frequency unit (RF unit) 2480.

The RF unit 2480 is connected to the processor 2460, thereby being capable of transmitting and/or receiving radio signals.

The processor 2460 may implement the functions, processes, and/or methods proposed in the exemplary embodiment of the present invention. For example, the processor 2460 may be realized to perform the non-AP STA operations according to the above-described exemplary embodiments of the present invention. The processor may perform the operations of the non-AP STA, which are disclosed in the exemplary embodiments of FIG. 1 to FIG. 23.

The processor 2410 and 2460 may include an application-specific integrated circuit (ASIC), another chip set, a logical circuit, a data processing device, and/or a converter converting a baseband signal and a radio signal to and from one another. The memory 2420 and 2470 may include a read-only memory (ROM), a random access memory (RAM), a flash memory, a memory card, a storage medium, and/or another storage device. The RF unit 2430 and 2480 may include one or more antennas transmitting and/or receiving radio signals.

When the exemplary embodiment is implemented as software, the above-described method may be implemented as a module (process, function, and so on) performing the above-described functions. The module may be stored in the memory 2420 and 2470 and may be executed by the processor 2410 and 2460. The memory 2420 and 2470 may be located inside or outside of the processor 2410 and 2460 and may be connected to the processor 2410 and 2460 through a diversity of well-known means.

As described above, the method and device for processing an uplink unit in a wireless LAN system have the following advantages.

The method according to the example of this specification has the technical advantage of enhancing uplink transmission.

An example of this specification proposes a CSD application method that can enhance processing efficiency of a LTF signal being included in a multi-user PPDU, which is used in an uplink.

A method for applying an orthogonal mapping matrix according to an example of this specification enhances the processing efficiency of an LTF signal of an uplink multi-user PPDU.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of processing data in a wireless local area network (LAN) system, comprising:
   receiving, by a device, a first Multi-user Physical layer Protocol Data Unit (MU PPDU) from a first user and receiving a second MU PPDU from a second user; and
   decoding, by the device, the first and second uplink MU PPDUs and delivering the decoded first and second uplink MU PPDUs to a higher layer of the device,
   wherein each of the first and second uplink MU PPDUs corresponds to at least one stream,
   wherein the first and second uplink MU PPDUs include first and second long training field (LTF) signals, respectively,
   wherein the first LTF signal is generated by applying a first row of an orthogonal mapping matrix and a first cyclic shift delay (CSD) value to a pre-defined LTF sequence, with the first row of the orthogonal mapping matrix being repeatedly applied to the pre-defined LTF sequence in a unit of a length of the first row of the orthogonal mapping matrix,
   wherein the second LTF signal is generated by applying a second row of the orthogonal mapping matrix and a second cyclic shift delay (CSD) value to the pre-defined LTF sequence, with the second row of the orthogonal mapping matrix being repeatedly applied to the pre-defined LTF sequence in a unit of a length of the second row of the orthogonal mapping matrix,
   wherein the orthogonal mapping matrix is a 8-by-8 matrix, and
   wherein the first CSD value is different from the second CSD value.

2. The method of claim 1, wherein a per-stream CSD value allocated to the first LTF signal and a per-stream CSD value allocated to the second LTF signal are determined by global stream indexes.

3. The method of claim 2, wherein the global stream indexes are differently determined for all streams corresponding to the first uplink MU PPDU and for all streams corresponding to the second MU PPDU.

4. The method of claim 1, wherein the orthogonal mapping matrix is indicated as $P_{8 \times 8}$, and
   wherein $P_{8 \times 8}$ is defined by $$P_{8\times 8} = \begin{bmatrix} P_{4\times 4} & P_{4\times 4} \\ P_{4\times 4} & -P_{4\times 4} \end{bmatrix},$$

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

5. A receiving device of a wireless local area network (LAN) system, the device comprising:
   a transceiver transmitting or receiving a radio signal; and
   a processor controlling the transceiver, and
   wherein the processor is configured:
      to control the transceiver, so as to receive a first Multi-user Physical layer Protocol Data Unit (MU PPDU) from a first user and to receive a second MU PPDU from a second user, and
      to decode the first and second uplink MU PPDUs and deliver the decoded first and second uplink MU PPDUs to a higher layer of the receiving device,
   wherein each of the first and second uplink MU PPDUs corresponds to at least one stream,
   wherein the first and second uplink MU PPDUs includes first and second long training field (LTF) signals, respectively,
   wherein the first LTF signal is generated by applying a first row of an orthogonal mapping matrix and a first cyclic shift delay (CSD) value to a pre-defined LTF sequence, with the first row of the orthogonal mapping matrix being repeatedly applied to the pre-defined LTF sequence in a unit of a length of the first row of the orthogonal mapping matrix,
   wherein the second LTF signal is generated by applying a second row of the orthogonal mapping matrix and a second cyclic shift delay (CSD) value to the pre-defined LTF sequence, with the second row of the orthogonal mapping matrix being repeatedly applied to the pre-defined LTF sequence in a unit of a length of the second row of the orthogonal mapping matrix,
   wherein the orthogonal mapping matrix is a 8-by-8 matrix, and
   wherein the first CSD value is different from the second CSD value.

6. The receiving device of claim 5, wherein a per-stream CSD value allocated to the first LTF signal and a per-stream CSD value allocated to the second LTF signal are determined by global stream indexes.

7. The receiving device of claim 6, wherein the global stream indexes are differently determined for all streams corresponding to the first uplink MU PPDU and for all streams corresponding to the second MU PPDU.

8. The receiving device of claim 5 wherein the orthogonal mapping matrix is indicated as $P_{8\times 8}$, and
   wherein $P_{8\times 8}$ is defined by $$P_{8\times 8} = \begin{bmatrix} P_{4\times 4} & P_{4\times 4} \\ P_{4\times 4} & -P_{4\times 4} \end{bmatrix},$$

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

* * * * *